US012128692B2

(12) United States Patent
Jannasch

(10) Patent No.: US 12,128,692 B2
(45) Date of Patent: Oct. 29, 2024

(54) METHOD FOR CREATING CONTROL DATA FOR MULTI-COLOR DIRECT THERMAL PRINTING

(71) Applicant: Bizerba SE & Co. KG, Balingen (DE)

(72) Inventor: Uwe Jannasch, Dortmund (DE)

(73) Assignee: Bizerba SE & Co. KG, Balingen (DE)

( * ) Notice: Subject to any disclaimer, the term of this patent is extended or adjusted under 35 U.S.C. 154(b) by 506 days.

(21) Appl. No.: 17/557,155

(22) Filed: Dec. 21, 2021

(65) Prior Publication Data

US 2022/0203703 A1 Jun. 30, 2022

(30) Foreign Application Priority Data

Dec. 31, 2020 (EP) .................................... 20218029

(51) Int. Cl.
*B41J 2/355* (2006.01)
*B41J 2/325* (2006.01)
*B41J 3/60* (2006.01)

(52) U.S. Cl.
CPC ............... *B41J 2/355* (2013.01); *B41J 2/325* (2013.01); *B41J 3/60* (2013.01)

(58) Field of Classification Search
CPC ..... B41J 2/355; B41J 2/325; B41J 3/60; B41J 2/32
See application file for complete search history.

(56) References Cited

U.S. PATENT DOCUMENTS

| | | | | |
|---|---|---|---|---|
| 5,765,954 | A | 6/1998 | Nunokawa et al. | |
| 2013/0002784 | A1* | 1/2013 | Iguchi | B41M 5/282 347/179 |

FOREIGN PATENT DOCUMENTS

| | | | |
|---|---|---|---|
| DE | 60207488 | T2 | 7/2006 |
| DE | 60036515 | T2 | 6/2008 |
| EP | 1006000 | A1 | 6/2000 |
| EP | 1866161 | B1 | 10/2014 |
| EP | 3175993 | A1 | 6/2017 |
| ES | 2323736 | T3 | 7/2009 |
| WO | WO 2007002122 | A1 | 1/2007 |
| WO | WO 2020013820 | A1 | 1/2020 |

OTHER PUBLICATIONS

U.S. Appl. No. 17/548,619, filed Dec. 13, 2021.

* cited by examiner

*Primary Examiner* — Thinh H Nguyen
(74) *Attorney, Agent, or Firm* — LEYDIG, VOIT & MAYER, LTD.

(57) ABSTRACT

A direct thermal printer prints on direct thermal printing paper, which has a thermo-reactive layer that can form two colors. A first color is formed at a first temperature, and a second at a second temperature, higher than the first. A printhead of the printer has heat sources arranged transversely to a paper path. Image data of an original image having at least the first color and the second color may be received. Control data may be created for the direct thermal printer for two-color printing of a print image. The control data has a plurality of print lines, and causes, for each print line for each heat source, either heating of the heat source to a printing temperature or no heating of the respectively heat source.

14 Claims, 14 Drawing Sheets

Control of the printhead
active (1) / inactive (0) heat source

| Time | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| t=0 | 1 | 0 | 1 | 0 | 1 | 0 | 1 | 0 | 1 | 0 | 1 | 0 | 1 | 0 |
| t1 | 0 | 0 | 0 | 0 | 0 | 0 | 0 | 0 | 0 | 0 | 0 | 0 | 0 | 0 |
| 2*t1 | 1 | 0 | 1 | 0 | 1 | 0 | 1 | 0 | 1 | 0 | 1 | 0 | 1 | 0 |
| 3*t1 | 0 | 0 | 0 | 0 | 0 | 0 | 0 | 0 | 0 | 0 | 0 | 0 | 0 | 0 |
| 4*t1 | 1 | 0 | 1 | 0 | 1 | 0 | 1 | 0 | 1 | 0 | 1 | 0 | 1 | 0 |
| 5*t1 | 0 | 0 | 0 | 0 | 0 | 0 | 0 | 0 | 0 | 0 | 0 | 0 | 0 | 0 |
| 6*t1 | 1 | 0 | 1 | 0 | 1 | 0 | 1 | 0 | 1 | 0 | 1 | 0 | 1 | 0 |
| 7*t1 | 0 | 0 | 0 | 0 | 0 | 0 | 0 | 0 | 0 | 0 | 0 | 0 | 0 | 0 |
| 8*t1 | 1 | 0 | 1 | 0 | 1 | 0 | 1 | 0 | 1 | 0 | 1 | 0 | 1 | 0 |
| 9*t1 | 0 | 0 | 0 | 0 | 0 | 0 | 0 | 0 | 0 | 0 | 0 | 0 | 0 | 0 |
| 10*t1 | 1 | 0 | 1 | 0 | 1 | 0 | 1 | 0 | 1 | 0 | 1 | 0 | 1 | 0 |
| 11*t1 | 0 | 0 | 0 | 0 | 0 | 0 | 0 | 0 | 0 | 0 | 0 | 0 | 0 | 0 |
| 12*t1 | 1 | 0 | 1 | 0 | 1 | 0 | 1 | 0 | 1 | 0 | 1 | 0 | 1 | 0 |
| 13*t1 | 0 | 0 | 0 | 0 | 0 | 0 | 0 | 0 | 0 | 0 | 0 | 0 | 0 | 0 |

Control of the printhead
active (1) / inactive (0) heat source

| Time | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| t=0 | 0 | 0 | 0 | 0 | 0 | 0 | 0 | 0 | 0 | 0 | 0 | 0 | 0 | 0 |
| tz | 0 | 0 | 0 | 0 | 0 | 0 | 0 | 0 | 0 | 0 | 0 | 0 | 0 | 0 |
| 2*tz | 0 | 0 | 1 | 0 | 0 | 0 | 1 | 0 | 0 | 0 | 1 | 0 | 0 | 0 |
| 3*tz | 0 | 0 | 0 | 0 | 0 | 0 | 0 | 0 | 0 | 0 | 0 | 0 | 0 | 0 |
| 4*tz | 0 | 0 | 0 | 0 | 0 | 0 | 0 | 0 | 0 | 0 | 0 | 0 | 0 | 0 |
| 5*tz | 0 | 0 | 0 | 0 | 0 | 0 | 0 | 0 | 0 | 0 | 0 | 0 | 0 | 0 |
| 6*tz | 0 | 0 | 1 | 0 | 0 | 0 | 1 | 0 | 0 | 0 | 1 | 0 | 0 | 0 |
| 7*tz | 0 | 0 | 0 | 0 | 0 | 0 | 0 | 0 | 0 | 0 | 0 | 0 | 0 | 0 |
| 8*tz | 0 | 0 | 0 | 0 | 0 | 0 | 0 | 0 | 0 | 0 | 0 | 0 | 0 | 0 |
| 9*tz | 0 | 0 | 0 | 0 | 0 | 0 | 0 | 0 | 0 | 0 | 0 | 0 | 0 | 0 |
| 10*tz | 0 | 0 | 1 | 0 | 0 | 0 | 1 | 0 | 0 | 0 | 1 | 0 | 0 | 0 |
| 11*tz | 0 | 0 | 0 | 0 | 0 | 0 | 0 | 0 | 0 | 0 | 0 | 0 | 0 | 0 |
| 12*tz | 0 | 0 | 0 | 0 | 0 | 0 | 0 | 0 | 0 | 0 | 0 | 0 | 0 | 0 |
| 13*tz | 0 | 0 | 0 | 0 | 0 | 0 | 0 | 0 | 0 | 0 | 0 | 0 | 0 | 0 |

Control of the printhead
active (1) / inactive (0) heat source

| Time | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| t=0 | 0 | 0 | 0 | 0 | 0 | 0 | 0 | 0 | 0 | 0 | 0 | 0 | 0 | 0 |
| $t_2$ | 0 | 1 | 0 | 1 | 0 | 1 | 0 | 1 | 0 | 1 | 0 | 1 | 0 | 1 |
| $2*t_2$ | 0 | 0 | 0 | 0 | 0 | 0 | 0 | 0 | 0 | 0 | 0 | 0 | 0 | 0 |
| $3*t_2$ | 0 | 0 | 0 | 0 | 0 | 0 | 0 | 0 | 0 | 0 | 0 | 0 | 0 | 0 |
| $4*t_2$ | 0 | 1 | 0 | 0 | 0 | 1 | 0 | 0 | 0 | 1 | 0 | 0 | 0 | 1 |
| $5*t_2$ | 0 | 0 | 0 | 0 | 0 | 0 | 0 | 0 | 0 | 0 | 0 | 0 | 0 | 0 |
| $6*t_2$ | 0 | 0 | 0 | 0 | 0 | 0 | 0 | 0 | 0 | 0 | 0 | 0 | 0 | 0 |
| $7*t_2$ | 0 | 1 | 0 | 1 | 0 | 1 | 0 | 1 | 0 | 1 | 0 | 1 | 0 | 1 |
| $8*t_2$ | 0 | 0 | 0 | 0 | 0 | 0 | 0 | 0 | 0 | 0 | 0 | 0 | 0 | 0 |
| $9*t_2$ | 0 | 0 | 0 | 0 | 0 | 0 | 0 | 0 | 0 | 0 | 0 | 0 | 0 | 0 |
| $10*t_2$ | 0 | 1 | 0 | 0 | 0 | 1 | 0 | 0 | 0 | 1 | 0 | 0 | 0 | 1 |
| $11*t_2$ | 0 | 0 | 0 | 0 | 0 | 0 | 0 | 0 | 0 | 0 | 0 | 0 | 0 | 0 |
| $12*t_2$ | 0 | 0 | 0 | 0 | 0 | 0 | 0 | 0 | 0 | 0 | 0 | 0 | 0 | 0 |
| $13*t_2$ | 0 | 1 | 0 | 1 | 0 | 1 | 0 | 1 | 0 | 1 | 0 | 1 | 0 | 1 |

Control of the printhead
active (1) / inactive (0) heat source

| Time | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| t=0 | 0 | 0 | 0 | 0 | 0 | 0 | 0 | 0 | 0 | 0 | 0 | 0 | 1 | 0 |
| tz | 0 | 0 | 0 | 0 | 0 | 0 | 0 | 0 | 0 | 1 | 0 | 1 | 0 | 0 |
| 2*tz | 0 | 0 | 0 | 0 | 0 | 0 | 1 | 0 | 1 | 0 | 0 | 0 | 0 | 0 |
| 3*tz | 0 | 0 | 0 | 1 | 0 | 1 | 0 | 0 | 0 | 0 | 0 | 0 | 0 | 0 |
| 4*tz | 1 | 0 | 1 | 0 | 0 | 0 | 0 | 0 | 0 | 0 | 0 | 0 | 0 | 0 |
| 5*tz | 0 | 0 | 0 | 0 | 0 | 0 | 0 | 0 | 0 | 0 | 0 | 0 | 1 | 0 |
| 6*tz | 0 | 0 | 0 | 0 | 0 | 0 | 0 | 0 | 0 | 1 | 0 | 1 | 0 | 0 |
| 7*tz | 0 | 0 | 0 | 0 | 0 | 0 | 1 | 0 | 1 | 0 | 0 | 0 | 0 | 0 |
| 8*tz | 0 | 0 | 0 | 1 | 0 | 1 | 0 | 0 | 0 | 0 | 0 | 0 | 0 | 0 |
| 9*tz | 1 | 0 | 1 | 0 | 0 | 0 | 0 | 0 | 0 | 0 | 0 | 0 | 0 | 0 |
| 10*tz | 0 | 0 | 0 | 0 | 0 | 0 | 0 | 0 | 0 | 0 | 0 | 0 | 1 | 0 |
| 11*tz | 0 | 0 | 0 | 0 | 0 | 0 | 0 | 0 | 0 | 1 | 0 | 1 | 0 | 0 |
| 12*tz | 0 | 0 | 0 | 0 | 0 | 0 | 1 | 0 | 1 | 0 | 0 | 0 | 0 | 0 |
| 13*tz | 0 | 0 | 0 | 1 | 0 | 1 | 0 | 0 | 0 | 0 | 0 | 0 | 0 | 0 |
| 14*tz | 1 | 0 | 1 | 0 | 0 | 0 | 0 | 0 | 0 | 0 | 0 | 0 | 0 | 0 |
| 15*tz | 0 | 0 | 0 | 0 | 0 | 0 | 0 | 0 | 0 | 0 | 0 | 0 | 1 | 0 |

| Time | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| t=0 | 0 | 0 | 0 | 0 | 0 | 0 | 0 | 0 | 0 | 0 | 0 | 0 | 0 | 0 |
| t1 | 0 | 0 | 0 | 0 | 0 | 0 | 0 | 0 | 0 | 0 | 0 | 0 | 0 | 0 |
| 2*t1 | 0 | 0 | 1 | 1 | 1 | 1 | 0 | 0 | 0 | 0 | 0 | 0 | 0 | 0 |
| 3*t1 | 0 | 0 | 1 | 1 | 1 | 1 | 0 | 0 | 0 | 0 | 0 | 0 | 0 | 0 |
| 4*t1 | 0 | 0 | 1 | 1 | 1 | 1 | 0 | 0 | 0 | 0 | 0 | 0 | 0 | 0 |
| 5*t1 | 0 | 0 | 1 | 1 | 1 | 1 | 0 | 0 | 0 | 0 | 0 | 0 | 0 | 0 |
| 6*t1 | 0 | 0 | 0 | 0 | 0 | 0 | 0 | 0 | 0 | 0 | 0 | 0 | 0 | 0 |
| 7*t1 | 0 | 0 | 0 | 0 | 0 | 0 | 0 | 0 | 0 | 0 | 0 | 0 | 0 | 0 |
| 8*t1 | 0 | 0 | 0 | 0 | 0 | 0 | 0 | 0 | 0 | 0 | 0 | 0 | 0 | 0 |
| 9*t1 | 0 | 0 | 0 | 0 | 0 | 0 | 0 | 0 | 0 | 0 | 0 | 0 | 0 | 0 |
| 10*t1 | 0 | 0 | 0 | 0 | 0 | 0 | 0 | 0 | 0 | 0 | 0 | 0 | 0 | 0 |
| 11*t1 | 0 | 0 | 0 | 0 | 0 | 0 | 0 | 0 | 0 | 0 | 0 | 0 | 0 | 0 |
| 12*t1 | 0 | 0 | 0 | 0 | 0 | 0 | 0 | 0 | 0 | 0 | 0 | 0 | 0 | 0 |
| 13*t1 | 0 | 0 | 0 | 0 | 0 | 0 | 0 | 0 | 0 | 0 | 0 | 0 | 0 | 0 |

Control of the printhead
active (1) / inactive (0) heat source

| Time | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| t=0 | 0 | 0 | 1 | 1 | 0 | 0 | 0 | 1 | 1 | 1 | 0 | 0 | 0 | 0 |
| tz | 0 | 0 | 1 | 1 | 0 | 0 | 0 | 1 | 1 | 1 | 0 | 0 | 0 | 0 |
| 2*tz | 0 | 0 | 1 | 1 | 0 | 0 | 0 | 1 | 1 | 1 | 0 | 0 | 0 | 0 |
| 3*tz | 0 | 0 | 1 | 1 | 0 | 0 | 0 | 1 | 1 | 1 | 0 | 0 | 0 | 0 |
| 4*tz | 0 | 0 | 1 | 1 | 0 | 0 | 0 | 1 | 1 | 1 | 0 | 0 | 0 | 0 |
| 5*tz | 0 | 0 | 1 | 1 | 0 | 0 | 0 | 1 | 1 | 1 | 0 | 0 | 0 | 0 |
| 6*tz | 0 | 0 | 1 | 1 | 0 | 0 | 0 | 1 | 1 | 1 | 0 | 0 | 0 | 0 |
| 7*tz | 0 | 0 | 1 | 1 | 0 | 0 | 0 | 1 | 1 | 1 | 0 | 0 | 0 | 0 |
| 8*tz | 0 | 0 | 1 | 1 | 0 | 0 | 0 | 1 | 1 | 1 | 0 | 0 | 0 | 0 |
| 9*tz | 0 | 0 | 1 | 1 | 0 | 0 | 0 | 1 | 1 | 1 | 0 | 0 | 0 | 0 |
| 10*tz | 0 | 0 | 1 | 1 | 0 | 0 | 0 | 0 | 0 | 0 | 0 | 0 | 0 | 0 |
| 11*tz | 0 | 0 | 1 | 1 | 0 | 0 | 0 | 0 | 0 | 0 | 0 | 0 | 0 | 0 |
| 12*tz | 0 | 0 | 1 | 1 | 0 | 0 | 0 | 0 | 0 | 0 | 0 | 0 | 0 | 0 |
| 13*tz | 0 | 0 | 0 | 0 | 0 | 0 | 0 | 0 | 0 | 0 | 0 | 0 | 0 | 0 |
| 14*tz | 0 | 0 | 0 | 0 | 0 | 0 | 0 | 0 | 0 | 0 | 0 | 0 | 0 | 0 |
| 15*tz | 0 | 0 | 0 | 0 | 0 | 0 | 0 | 0 | 0 | 0 | 0 | 0 | 0 | 0 |

Control of the printhead
active (1) / inactive (0) heat source

| Time | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| t=0 | 0 | 0 | 0 | 0 | 0 | 0 | 0 | 0 | 0 | 0 | 0 | 0 | 0 | 0 |
| t1 | 0 | 0 | 0 | 0 | 0 | 0 | 0 | 0 | 0 | 0 | 0 | 0 | 0 | 0 |
| 2*t1 | 0 | 0 | 0 | 0 | 0 | 0 | 0 | 1 | 1 | 0 | 0 | 0 | 0 | 0 |
| 3*t1 | 0 | 0 | 0 | 0 | 0 | 0 | 1 | 1 | 1 | 0 | 0 | 0 | 0 | 0 |
| 4*t1 | 0 | 0 | 0 | 0 | 0 | 1 | 1 | 1 | 1 | 0 | 0 | 0 | 0 | 0 |
| 5*t1 | 0 | 0 | 0 | 0 | 1 | 1 | 1 | 1 | 1 | 0 | 0 | 0 | 0 | 0 |
| 6*t1 | 0 | 0 | 0 | 0 | 1 | 1 | 0 | 1 | 1 | 0 | 0 | 0 | 0 | 0 |
| 7*t1 | 0 | 0 | 0 | 0 | 1 | 0 | 0 | 1 | 1 | 0 | 0 | 0 | 0 | 0 |
| 8*t1 | 0 | 0 | 0 | 0 | 0 | 0 | 0 | 1 | 1 | 0 | 0 | 0 | 0 | 0 |
| 9*t1 | 0 | 0 | 0 | 0 | 0 | 0 | 0 | 1 | 1 | 0 | 0 | 0 | 0 | 0 |
| 10*t1 | 0 | 0 | 0 | 0 | 0 | 0 | 0 | 1 | 1 | 0 | 0 | 0 | 0 | 0 |
| 11*t1 | 0 | 0 | 0 | 0 | 0 | 0 | 0 | 1 | 1 | 0 | 0 | 0 | 0 | 0 |
| 12*t1 | 0 | 0 | 0 | 0 | 0 | 0 | 0 | 1 | 1 | 0 | 0 | 0 | 0 | 0 |
| 13*t1 | 0 | 0 | 0 | 0 | 0 | 0 | 0 | 0 | 0 | 0 | 0 | 0 | 0 | 0 |
| 14*t1 | 0 | 0 | 0 | 0 | 0 | 0 | 0 | 0 | 0 | 0 | 0 | 0 | 0 | 0 |

METHOD FOR CREATING CONTROL DATA FOR MULTI-COLOR DIRECT THERMAL PRINTING

CROSS-REFERENCE TO PRIOR APPLICATION

This application claims benefit to European Patent Application No. EP 20218029.5, filed on Dec. 31, 2020, which is hereby incorporated by reference herein.

FIELD

The present invention relates to a method for creating control data for multi-color direct thermal printing.

BACKGROUND

Direct thermal printing papers discolor in different colors in response to different temperatures. For example, the direct thermal printing paper KLRB 46B from the company Kanzan is a paper that colors red at a temperature of 75° C. to 80° C. and colors black at a temperature of 95° C. to 105° C.

EP1866161B1 shows a two-color direct thermal printing paper. In addition, EP1866161B1 shows a printer for printing on such a direct thermal printing paper comprising two printheads, wherein the first printhead applies a temperature to the direct thermal printing paper, which triggers a discoloration in the first color and the second printhead applies a temperature to the direct thermal printing paper which triggers a discoloration in the second color. From EP3175993B1, a direct thermal printing paper is known, on which three colors can be printed.

Direct thermal printers with a printhead, the thermocouples of which can produce two different temperatures, are known from DE60207488T2 and DE60036515T2. A two-color printing can thus be produced on the direct thermal printing paper. These printheads and their control are expensive and complex.

SUMMARY

In an embodiment, the present disclosure provides a method that creates control data for operating a direct thermal printer for printing on direct thermal printing paper. The direct thermal printing paper has at least one thermo-reactive layer. At least two colors are formable in the at least one thermo-reactive layer. The at least one thermo-reactive layer is configured to form a first color upon a first temperature being supplied, and to form a second color upon a second temperature being supplied, the second temperature being higher than the first temperature. The direct thermal printer has a printhead along a paper path from a paper receptacle to a paper outlet. The printhead has heat sources that are arranged next to one another transversely to the paper path and are electrically controllable and which are configured to selectively apply heat to the direct thermal printing paper that is movable along the printhead. The method includes: receiving, via an input/output device or a receiving device, image data of an original image having at least the first color and the second color; and creating, with a controller, control data for the direct thermal printer for two-color printing of a print image having the first color and the second color. The control data has a plurality of print lines, and causes, for each print line for each heat source of the heat sources of the printhead, either heating of the respective heat source to a printing temperature or no heating of the respectively heat source.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
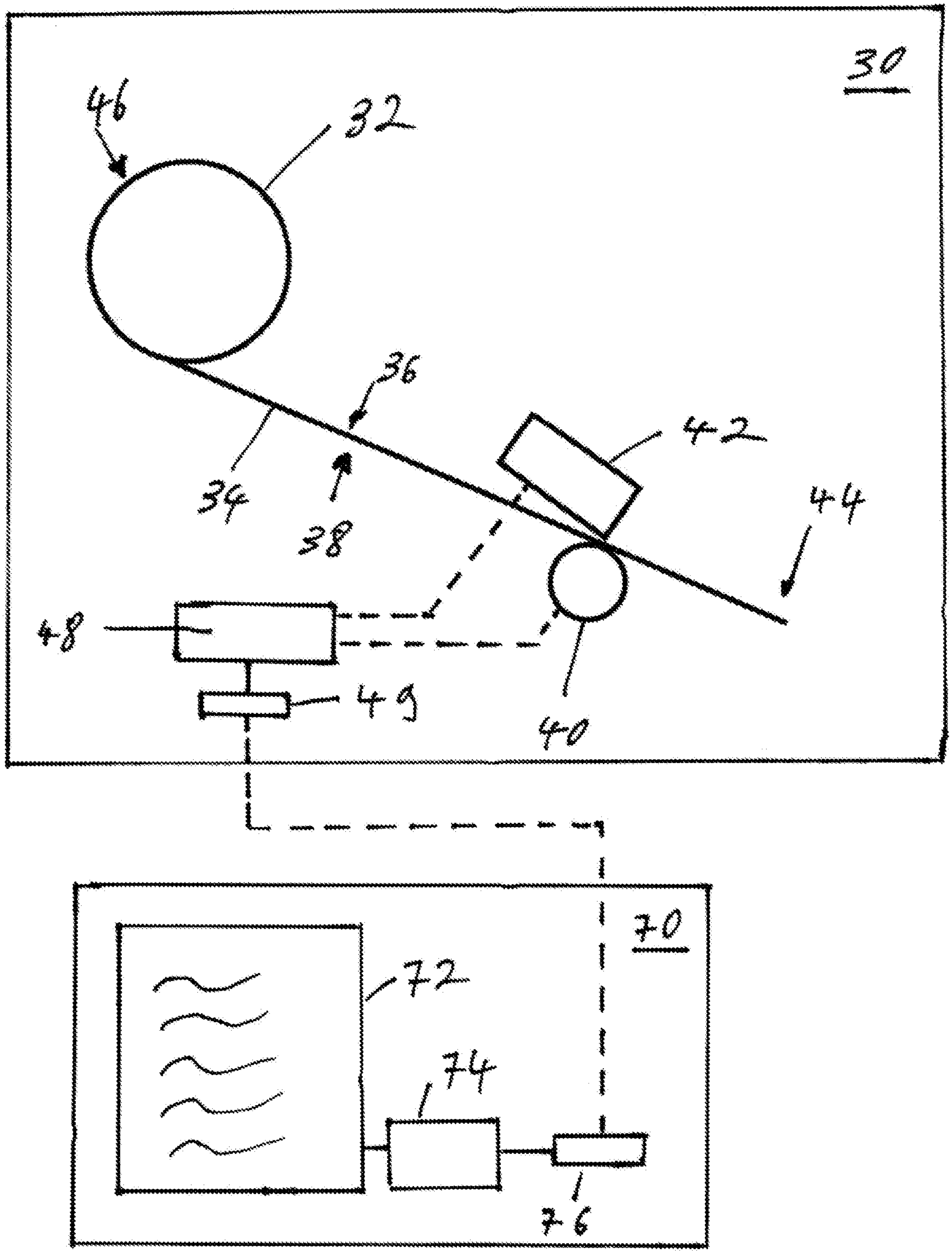
FIG. 1 shows a schematic representation of a direct thermal printer.

Aspects of the present invention provide more cost-effective multi-color direct thermal printing.

An embodiment of the present invention provides a method for creating control data for operating a direct thermal printer for printing on direct thermal printing paper. The direct thermal printing paper comprises at least one thermo-reactive layer. At least two colors can be formed with the at least one thermo-reactive layer. When a first temperature is supplied, i.e., when a dot on the direct thermal printing paper is heated to a first temperature, a first color is formed. When a second temperature is supplied, a second color is formed. In this case, the second temperature is higher than the first temperature. The direct thermal printing paper is moved along a paper path from a paper receptacle to a paper outlet by the direct thermal printer. The direct thermal printer further comprises a printhead that comprises heat sources that are arranged next to one another transversely to the paper path and are electrically controllable. In one embodiment, the heat sources are electrical resistors that heat up when current flows through them. The heat sources selectively supply heat to the direct thermal printing paper. The method comprises the following steps:

- Receiving image data of an original image having at least a first color and a second color. This is an image that is predetermined and that is to be printed by the direct thermal printer. The person skilled in the art understands that the direct thermal printer is to produce as exact a copy of the original as possible, which does not necessarily have to look exactly the same. If the original image is available as a prepared graphic, for example in an image file, the original image is received in the method via a receiver device for receiving data. However, the original image may also be created on a data processing device on which the method is executed. Then, via an input/output device, control commands are received from an operator representing an arrangement of texts, graphics, colors, etc. and the original image is received in this way.

Control data for a direct thermal printer are created with a control device. The control data are suitable for two-color printing of a print image. The two-color print of the print image consists of the first color and the second color. The control data comprise a plurality of printing lines. For each printing line, it is stored in the control data which heat sources of the printhead are heated to the printing temperature and which heat sources of the printhead are not heated.

The direct thermal printing paper is continuously guided past the printhead and thus printed one line after the other. Thus, the control data for the print lines are control data that are sent to the printhead one after the other and the heat sources are accordingly controlled again and again at time intervals and heated or not heated to the print temperature.

In one embodiment, the control data causes a plurality of adjacent heat sources to be heated to the printing temperature at the locations where the second color is to be formed on the direct thermal printing paper. At the locations where the first color is to be formed on the direct thermal printing paper, the control data from a plurality of adjacent heat sources cause one portion to be heated to the printing temperature and the other portion of the heat sources not to be heated.

The person skilled in the art understands that a plurality of adjacent heat sources may be adjacent heat sources in both the line direction and the column direction. Heat sources adjacent to one another in the line direction are heat sources arranged next to one another on the printhead. Heat sources adjacent to one another in the column direction are the same heat source in the printhead, which, however, are controlled line by line and thus one after the other. Even if, from the hardware point of view, there is only a single heat source, the line-by-line advancing and printing of the direct thermal printing paper means that the heat source is directed one after the other at printing pixels that are arranged next to one another in column direction.

In one embodiment, the method for creating control data comprises the steps of:

Identifying areas in the first color and areas in the second color in the image data. This step is carried out by the control device. In one embodiment, the areas are defined by the x coordinates and y coordinates of the dots forming the areas.

Creating a two-dimensional control pattern, wherein the areas of the image data in the second color are mapped in the control pattern with active print pixels. In one embodiment, the second color is black and the higher temperature is necessary for printing the direct thermal printing paper in black. For this reason, all heat sources that the area moves passed during the printing are heated to the printing temperature. This step is carried out by the control device.

Creating a two-dimensional control pattern, wherein the areas of the image data in the first color are mapped in the control pattern with a regular grid of active and passive print pixels. In one embodiment, the first color is red and the lower temperature is necessary for printing the direct thermal printing paper in red. For this reason, of the heat sources that the area moves past during the printing, some are heated to the print temperature and others are not heated. This step is carried out by the control device.

Converting the control pattern into control data by converting the active and passive print pixels from the control pattern line by line into control data for the heat sources. This step is carried out by the control device. Active printing pixels means that the corresponding heat source is heated to the printing temperature. Passive print pixels mean that the corresponding heat source is not heated.

If the original image is input via the input/output device and comprises, for example, a text in a black font and a text in a red font, it is already evident on the basis of the input which areas, namely the areas covered by the text, are exist in the image data in which color. If the original image is, for example, a graphic received electronically via the receiving device, an image recognition algorithm must be applied in order to identify the areas in the first color and the areas in the second color.

In one embodiment, the regular grid is a grid that repeats itself line by line and/or column by column or is arranged obliquely.

In one embodiment, areas of the first color in the image data are mapped in different regular grids in the control pattern based on their brightness. Dark areas in the first color comprise more active printing pixels in the control pattern than light areas in the first color. This is the case when the second color is black. As a result of more active printing pixels, there is a higher proportion of black pixels in direct thermal printing and the area of the first color appears darker to the human eye.

In one embodiment, for areas exceeding a certain brightness, at least parts of the active print pixels have a minimum distance in the control pattern. The minimum distance is selected such that an overlap of the first color, the second color and the paper color on the direct thermal printing paper occurs. In other words, the print pixels are arranged so far apart that an unprinted area, and therefore an area in the paper color, in particular a white area, remains between two areas printed by the print pixels on the direct thermal paper. By choosing a suitable distance between two print pixels, a white pixel can thus be included in the print and the brightness of the printed area is increased.

In one embodiment, the control pattern for brightening an area in the second color includes a plurality of print pixels arranged in a regular grid, in particular a plurality of groups of adjacent print pixels arranged in a regular grid that are inactive print pixels. All other printing pixels in the area are active printing pixels. An area of the second color comprises only active printing pixels. By inserting groups of inactive print pixels in a regular grid, white areas are created that brighten the second color. However, the white areas are bordered by a narrow edge of the first color. If the second color is black and the first color is red, a grayscale print is possible with such a control pattern, wherein the grayscale print will have a slight red shimmer.

In one embodiment, the input/output device comprises a display on which a graphical user interface is displayed. The input/output device is designed to receive inputs for creating a label layout, wherein the inputs comprise characters, standard graphics, colors, sizes, orientations and/or positions. The control device is designed to show the print image resulting from the created control data on the input/output device. In one embodiment, the control device is designed to compare the print image resulting from the control data created on the input/output device to the original image.

In one embodiment, the control device comprises an object detection device that recognizes at least one barcode in the image data from an original image received via the input/output device or receiving device. The control device outputs an error message via the input/output device if the barcode does not have the second color and/or is not aligned in a printing direction. A barcode can then be read particularly well if it is printed in black, and if the printing of the strips of the barcode takes place along the printing direction.

In one embodiment, the control device for the image data from an original image received by the receiving device performs the steps of:

Determining areas having a color and a brightness, wherein the colors of the area correspond to at least the first color, the second color, white or a superposition thereof.

Determining a grid of active and inactive print pixels for the individual areas.

This has the advantage that areas that look the same in terms of color and brightness are identified in an original image. Separate grids of active and inactive print pixels are then determined for these areas.

In one embodiment, the control device for the image data from an original image received by the receiving device performs the steps of:

Rendering the image data in dots of a size of at least 9 or 25 print pixels.

Determining a color and a brightness for each point.

Determining control data for each dot, wherein active and inactive print pixels for that dot are derived from the color and the brightness of each dot.

A method for printing on the direct thermal printing paper with a direct thermal printer and the control data comprises the following steps:

With a transport roller, the direct thermal printing paper is moved line by line along a printing direction. In doing so, the direct thermal printing paper passes through the printhead. In one embodiment, the direct thermal printing paper is moved continuously, i.e., without stopping. In one embodiment, the direct thermal printing paper is moved in a stepwise manner. In one embodiment, the movement speed, i.e., the transport speed of the direct thermal printing paper, is between 50 mm/s and 400 mm/s, in particular between 100 mm/s and 200 mm/s.

In each line of the direct thermal printing paper, selected heat sources of the printhead are electrically heated based on the control data. Of course, it is also possible for there to be lines in which no heat sources are heated because no printed pixels are present in these lines. At the points where the direct thermal printing paper is to form the second color, a plurality of adjacent heat sources is heated to a printing temperature. At the points where the direct thermal printing paper is to form the first color, a portion of the plurality of adjacent heat sources are heated to the printing temperature, and the other portion of the heat sources are not heated.

The two-color direct thermal printing paper, in particular the paper from Kanzan mentioned above, colors red when heat is supplied in a first temperature range of 75° C. to 80° C. and black at a temperature of 95° C. to 105° C. Since the paper slides along under the printhead and the heat sources are covered, for example, with a protective layer or a glass, and the paper as a linerless paper has a protective layer, in particular a silicone layer, above the thermo-reactive layer, the heat sources may have to have slightly higher temperatures than the aforementioned discoloration temperatures when printed. The direct thermal printing paper is designed so that two discrete temperatures are supplied for two-color printing. However, direct thermal printheads whose heat sources can produce two different temperatures are technically complex and partially unreliable.

The method according to one or more embodiments of the present invention has the advantage that only a discrete temperature, the printing temperature, needs to be generated at the heat sources. If a plurality of adjacent pixels is heated to the printing temperature, the printing temperature is transferred, and the direct thermal printing paper below these pixels heats up to the higher temperature range, in which the second color is formed. If from a group of adjacent heat sources, i.e., from a group of adjacent pixels, some are heated to the printing temperature and others are not, an average temperature is formed which is transferred to the direct thermal printing paper, which drops into the lower temperature range of the direct thermal printing paper and forms the first color.

It can be observed that the active heat sources, i.e., those heated to the printing temperature, form pixels in the second color on the direct thermal printing paper. In the vicinity of these pixels in the second color the points form in the first color, as the temperature on the direct thermal printing paper drops somewhat in these areas and corresponds to the lower temperature range. The method makes use of the effect that a selective heat source has heat radiation in the direct environment.

By using combination of active and inactive heat sources a pixel pattern on the direct thermal printing paper is achieved, which consists of a few pixels in the second color around each of which there are pixels in the first color. However, due to the small pixel size, the human eye does not perceive the individual pixels. Rather, depending on the ratio between active and inactive heat sources and their geometric arrangement, the region appears like an area in the first color.

The person skilled in the art understands that the unprinted direct thermal printing paper usually is white or has a white hue. This is not to be understood as the first or second color within the meaning of the invention.

In one embodiment, the second color is black. In one embodiment, the first color is red. The person skilled in the art understands that the first color and the second color refer to a reaction of the thermo-reactive layer. At the pixel where heat is applied, the thermo-reactive layer discolors. By combining different pixels of the first color with the second color as well as with the light, in particular white, color of the unprinted paper, color effects can be achieved, such as a light red area or a dark red area. These, however, consist of individual red, white and black pixels and are not to be regarded as separate colors for the purposes of this disclosure.

In one embodiment, the printing temperature is equal to or higher than the second temperature. The heat source must transfer heat to the paper in the temperature of the higher temperature range. This is the second temperature. Due to the effects that can occur due to the protective layer on the printhead and the protective layer on the direct thermal printing paper, the printing temperature may need to be slightly higher than the second temperature.

In one embodiment, the step of moving the direct thermal printing paper line by line takes place during a line time from a line n to a next line n+1. In one embodiment, the movement of the direct thermal printing paper takes place continuously, i.e., the paper is moved past the printhead at a constant or almost constant speed. In one embodiment, the movement of the direct thermal printing paper takes place stepwise, i.e., the direct thermal printing paper is moved to the next line n+1 and stopped until the line time has elapsed, and then moved on to the line n+2.

In one embodiment, when printing an area, the area on the direct thermal printing paper comprises a plurality of lines and a plurality of columns. From the perspective of the printhead, the lines correspond to a time at which this line is located below the heat sources of the printhead. From the perspective of the printhead, the columns of the area correspond to certain heat sources of the printhead. If an area on the direct thermal printing paper is printed in the second color, throughout times corresponding to the lines of the area, all heat sources corresponding to the columns of the lines are heated to the printing temperature. Thus, all heat sources corresponding to the projection on the area on the direct thermal printing paper are heated to the printing temperature and the area changes color to the second color. In other words, in order to print an area on the direct thermal printing paper in the second color, wherein the area comprises a plurality of lines (n, n+1, n+2) and a plurality of columns, all heat sources corresponding to the plurality of columns are heated to the printing temperature while printing the plurality of lines (n, n+1, n+2).

If, on the other hand, printing of the area is carried out in the first color, a portion of the heat sources mentioned in the previous section must be heated to the printing temperature (active heat sources) and another portion is not heated (inactive heat sources), i.e., the other portion of the heat sources is not electrically triggered. In other words, for printing an area on the direct thermal printing paper in the first color, wherein the area comprises a plurality of lines (n, n+1, n+2) and a plurality of columns, during the printing of the plurality of lines (n, n+1, n+2) by the heat sources, which correspond to the plurality of columns, a portion is heated to the printing temperature so that the projection of the heat sources onto the area corresponds to a regular grid of active and inactive heat sources, wherein there is an equal or larger number of inactive heat sources than active heat sources. As already stated above, pure printing in the first color, that is to say an area having exclusively pixels in the first color, is not possible using the present embodiment of the method of the present invention. However, the human eye perceives the area in the first color when the pixels of the first color and the pixels of the second color are arranged in a regular grid and the pixels of the first color predominate. Therefore, the same number or more inactive heat sources than active heat sources must be present in the grid on the projection of the area.

In one embodiment, for printing an area on the direct thermal printing paper in a color corresponding to a superposition of at least two of the first color, the second color and the paper color, wherein the area comprises a plurality of lines (n, n+1, n+2) and a plurality of columns, during the printing of the plurality of lines (n, n+1, n+2), the heat sources corresponding to the plurality of columns are heated to the printing temperature such that the projection of the heat sources onto the area corresponds to a regular grid of active and inactive heat sources. The paper color is white, although the white may have a slight reddish tinge. If the grid is arranged in such a way that the spacing between two heat sources, which are heated to the printing temperature, exceeds a minimum spacing in the line direction and the column direction, a white pixel appears on the area. Thus, it is possible to design a grid representing an overlay of pixels in the first color, in the second color and of white pixels. In one embodiment, the second color is black. Hues in the first color, in particular red, can be printed at different brightness levels. A grid comprising more active heat sources results in the printing of a darker hue of the first color on the direct thermal printing paper than a grid having less active heat sources. For example, if the first color is red and the second color is black, red hues can be generated in different brightnesses by a corresponding selection of the grid with white and black pixels, from a bright red with a large white component to a dark red that transitions into black. The fact that the printing of red pixels by means of the printing method always involves a black pixel in the middle, which is surrounded by red pixels, results in that there can be no pure red area and that an area perceived by the human eye as a red area consists of a plurality of red pixels and a smaller number of black pixels and in particular also a smaller number of white pixels.

In one embodiment, the regular grid is a grid that repeats itself line by line and/or column by column or is arranged obliquely or alternately. In this case, different effects can be achieved with different regular grids and, in particular, different brightnesses of the first color can be printed. A grid repeated over several pixels in line direction and column direction results in a small area having a certain brightness of the first color. Various geometric shapes can be composed of many small areas so that many shapes and a large degree of freedom for prints in the first and second color are created.

In one embodiment, the direct thermal printing paper is linerless paper. In one embodiment, the direct thermal printing paper comprises a silicon layer on the upper side. Linerless paper is a paper made of a continuous strip which does not comprise a carrier belt. The rear paper layer has an adhesive material, in particular an adhesive coating, in order to be able to adhere labels separated from the continuous strip to an object. To prevent the label web from sticking to itself when it is rolled up into a continuous roll, the upper side of the paper is provided with a silicone layer from which the adhesive material is removable. In the case of printing, this silicone layer on the direct thermal printing paper has the advantage that the heat of the heat source is somewhat distributed in the silicone layer and does not only penetrate the paper selectively under the heat source, but also in its surroundings. In the vicinity of the heat source, heat still penetrates into the paper, but at a slightly lower temperature. For example, the effect that a heat source which is heated to the printing temperature produces a black pixel and red pixels appear around it is particularly pronounced with linerless paper. In addition to the properties of the silicone material, this effect is also caused by the silicone layer providing a distance between heat sources and the thermo-reactive layer by its layer thickness. This distance also already leads to a certain propagation of the heat under the heat source.

In one embodiment, an active heat source is electrically controlled by the control device during a printing interval. The printing interval is divided into a saturation interval and a subsequent cooling interval. The saturation interval begins with a waiting time. The heat source is only supplied with current in the time after the waiting time has elapsed until the end of the saturation interval. The waiting time in line n depends on the status of the heat source in at least one preceding line n−1. In one embodiment, the printing interval corresponds to the line time. In one embodiment, the saturation interval is the same for all heat sources of the printhead. In one embodiment, the waiting time may be selected differently for each heat source and is dependent on the previous state of this heat source. If, for example, a heat source is heated to the printing temperature in a preceding line n−1, it will still have a certain residual heat in the following line. If this heat source is to be reheated to the printing temperature in this line n, slightly less current is required for this than for a cold heat source due to the residual heat. For this reason, no power is supplied during a waiting time. Thus, power supply does not take place throughout the entire saturation interval. The person skilled in the art knows this control of the heat sources under the term History Control. In one embodiment, the printhead comprises a temperature sensor on its surface. The saturation interval, which is the same for all heat sources, is determined as a function of the temperature of the temperature sensor. For example, in a very cold environment, a longer saturation interval is selected than in a warm environment.

According to an exemplary embodiment of the invention, a computer program having program code means is provided to perform the method of creating control data for operating a direct thermal printer for printing on direct thermal printing paper when the program is executed on a computer or on a computer of a direct thermal printer.

According to an exemplary embodiment of the invention, a computer program product having program code means stored on a computer-readable medium is provided to perform the method of creating control data for operating a direct thermal printer for printing on direct thermal printing paper when the computer program is executed on a computer or on a computer of a direct thermal printer.

According to an exemplary embodiment of the invention, a data processing device having an input/output device, a control device, in particular a central processing unit (CPU), and a transmitting/receiving device for transmitting and receiving data via a network is provided. The control device performs a method for creating control data for operating a direct thermal printer for printing direct thermal printing paper. The transmitting/receiving device is designed to transmit the control data and/or the control patterns to a direct thermal printer via the network.

According to an exemplary embodiment of the invention, a direct thermal printer for printing on direct thermal printing paper is provided. The direct thermal printing paper comprises at least one thermo-reactive layer. At least two colors can be formed with the at least one thermo-reactive layer. When a first temperature is supplied, a first color is formed, and when a second temperature is supplied, a second color is formed. The second temperature is higher than the first temperature. The direct thermal printer comprises a transport roller which moves the direct thermal printing paper along a paper path from a paper receptacle to a paper outlet. The direct thermal printer comprises a printhead that comprises heat sources that are arranged next to one another transversely to the paper path and are electrically controllable. The printhead selectively supplies heat to the direct thermal printing paper. The direct thermal printer comprises a control device which controls a rotation of the transport roller and, with the transport roller, moves the direct thermal printing paper line by line along the printhead in the direction of a printing direction. Each heat source of the printhead is electrically connected to the control device and can be heated to a printing temperature. The control device performs a method for creating control data for operating a direct thermal printer for printing direct thermal printing paper. The control device controls the heat sources with the control data.

In one embodiment, the control device is configured to heat selected heat sources of the printhead to the printing temperature in each line of the direct thermal printing paper. At the points where the second color is to be formed on the direct thermal printing paper, a plurality of adjacent heat sources is heated to the printing temperature. At the points where the first color is to be formed on the direct thermal printing paper, a portion of a plurality of adjacent heat sources is heated to the printing temperature and the other portion of the heat sources is not heated.

In one embodiment, the printing strip is a printing strip based on thick-film technology. Examples of printing strips based on thick-film technology are KD2004-DC91B by the company Rohm or the KPW-104-BZR by the company Kyocera. In one embodiment, the printing strip is a printing strip based on thin-film technology.

In one embodiment, the printing temperature is equal to or higher than the second temperature.

In one embodiment, the transport roller is a pressure roller that presses the direct thermal printing paper against the printhead.

In one embodiment, the direct thermal printer is a linerless printer and the direct thermal printing paper is a continuous paper made of linerless paper which is provided with a silicone layer on its upper side.

In one embodiment, the control device controls the transport roller so that the transport roller moves the direct thermal printing paper from one line n to a next line n+1 during a line time, wherein the movement takes place stepwise or continuously during the line time.

Some exemplary embodiments of the invention are shown by way of example in the drawings and are described in the following. The figures show, each in schematic representation:

FIG. 1 shows a schematic representation of a direct thermal printer 30. The printer comprises a paper path, which leads from a paper receptacle 46, in which a paper roll 32 is mounted, via a pressure roller 40 and a printhead 42 to a paper outlet 44.

The paper is wound in the form of a continuous strip of direct thermal printing paper 34 onto a roll of paper 32. The direct thermal printing paper 34 comprises an underside on which an adhesive layer is applied and an upper side 36 on which a silicone layer is applied. The pressure roller 40 serves as a transport roller for the continuous strip made of direct thermal printing paper 34. The pressure roller presses the direct thermal printing paper 34 with its upper side 36 against the printhead 42.

The direct thermal printer 30 comprises a control device (controller) 48 which is electrically connected to the printhead 42 and the pressure roller 40. The control device 48 controls the pressure roller 40, which moves the direct thermal printing paper 34 past the printhead 42 line by line. The control device 48 also controls the printhead 42; in particular, the control device 48 controls the heat sources 52 of the printhead 42 so that the desired print is produced in line n, which is currently located below the printhead 42 due to the transport of the direct thermal printing paper 34. The coordinated control of the pressure roller 40 and the printhead 42 by the control device 48 results in line-by-line printing on the direct thermal printing paper 34. In this case, the pixels in the column direction correspond to the individual heat sources 52; the pixels in the line direction n, n+1, n+2 correspond to the respective point in time t0, tz, 2tz at which the corresponding line n, n+1, n+2 is located under the printhead 42. The control device 48 is designed to heat or not heat each individual heat source 52 to a printing temperature.

The control device 48 is further connected to a transmitting/receiving device 49. With the transmitting/receiving device 49, the direct thermal printer 30 is connected via a network to a transmitting/receiving device 76 of a data processing device 70. The data processing device 70 comprises an input/output device 72 with which an operator can operate the data processing device 70. The operator can input image data of an original image, which is to be printed via the direct thermal printer 30, into the data processing device 70 via the input/output device 72. The data processing device 70 comprises a control device 74 which is designed to create control data. The control data are data for controlling the direct thermal printer 30. The control data are transmitted from the computing device 70 to the thermal direct printer via the transmitting/receiving device 76. In one embodiment, the data processing device 70 is integrated into the direct thermal printer 30.

Figure 2:
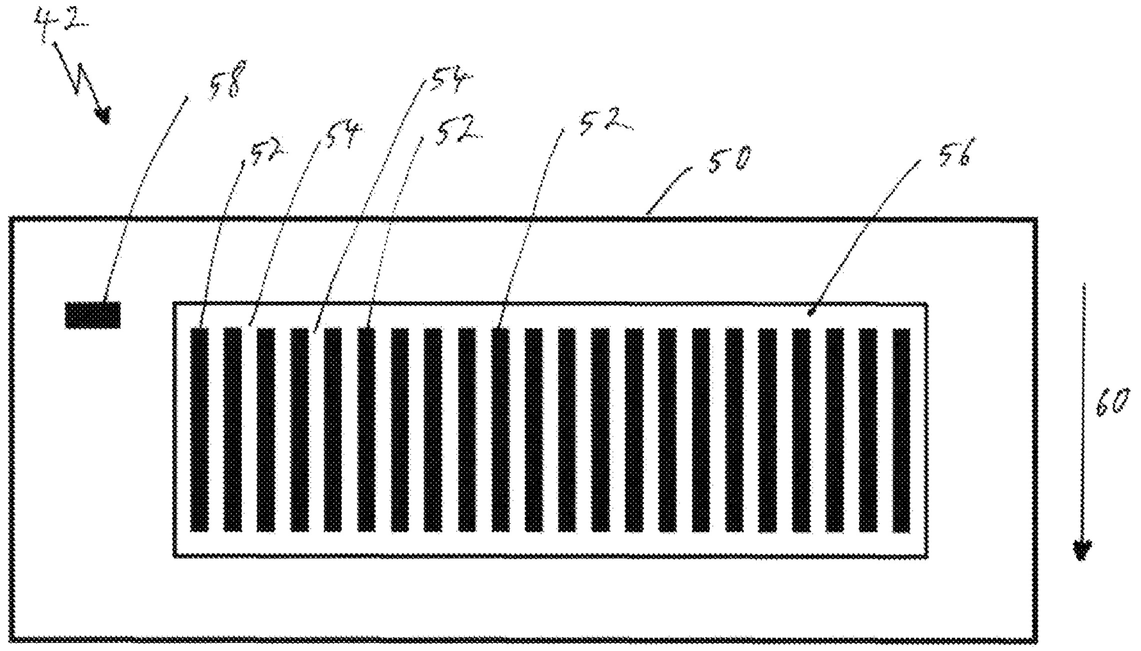
FIG. 2 shows a schematic representation of a printhead for a direct thermal printer.

FIG. 2 shows a bottom view of a printhead 42. On this side, the direct thermal paper 34 is moved past the printhead 42 line by line along a print direction 60 by the pressure roller 40. The printhead 42 comprises a print field 56 having a plurality of heat sources 52 mounted side by side. The heat sources selectively emit heat. There is a distance 54 between the heat sources 52. The distance 54 between the heat sources 52 is depicted as relatively wide in FIG. 2 for illustration purposes. In practice, the distance 54 between two adjacent heat sources 52 is very narrow. In FIG. 2 it should be merely indicated that each heat source 52 is mounted independently of the adjacent heat sources 52 and is separately controllable by the control device. The width of the print field 56 corresponds at least to the maximum printable width of the paper. The print field 56 is covered with a preferably highly thermally conductive cover in order to protect the heat sources 52 from mechanical damage. The heat sources 52 are in particular heat resistors. The printhead 42 comprises a temperature sensor 58 which measures the temperature 58 at the top of the printhead and forwards it as a parameter to the control device 48.

Typical values for the direct thermal paper width are 60 mm, 80 mm or 120 mm. A typical resolution of the linerless direct thermal printing paper of the applicant is 200 dpi, especially 300 dpi. A typical printing speed, i.e., a typical transport speed at which the paper is moved along under the printhead, is 100 mm/s to 400 mm/s, in particular 120 mm/s, 150 mm/s or 250 mm/s.

In order to achieve a resolution of 200 dpi, approximately 8 dots (~pixels) per mm are to be provided, i.e., 8 heat sources 52 per mm. In order to achieve a resolution of 300 dpi, approximately 12 dots (~pixels) per mm are to be provided, i.e., 12 heat sources 52 per mm. For a paper width of 80 mm, the printhead comprises at least 960 heat sources 52.

With a resolution of 300 dpi, 12 dots/mm, i.e., 12 lines/mm in the transport direction, are necessary. At a typical transport speed, i.e., printing speed, of 150 mm/s, the pressure roller has to make 1800 lines/s, i.e., 1800 steps per second.

Figure 3:
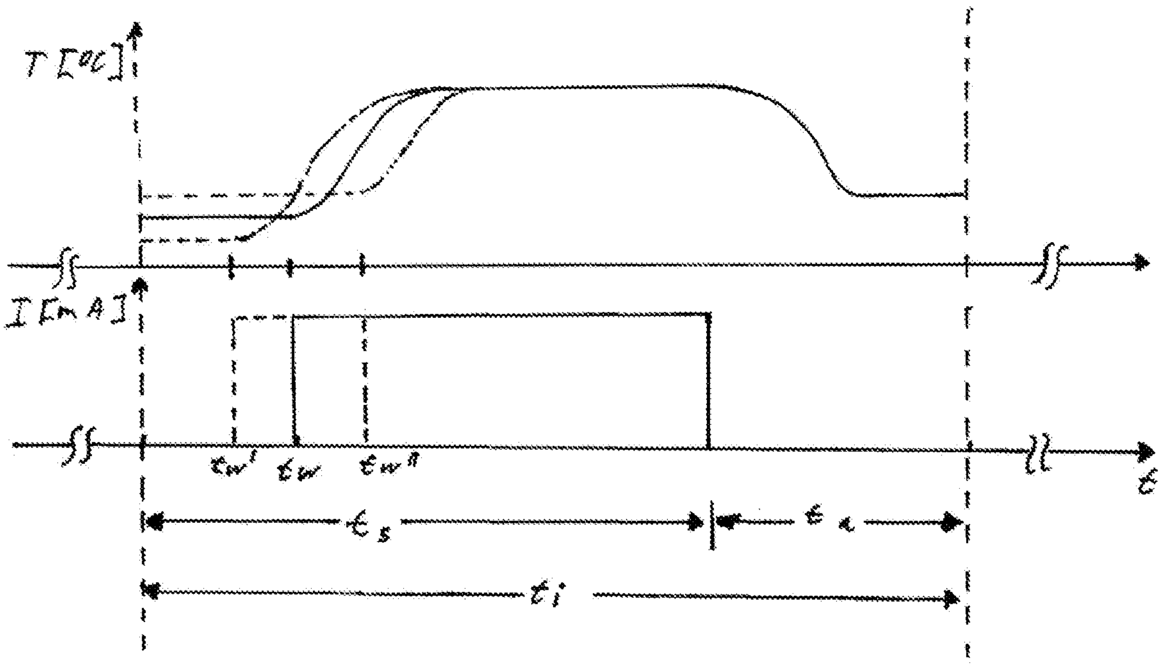
FIG. 3 shows a schematic representation of a temperature profile at a heat source during a printing interval and a representation of the current applied by the control device to the heat source.

FIG. 3 shows a schematic diagram for controlling a heat source 52 by the control device 48 (lower part) and the associated heat generation at the heat source 52 (upper part). A printing interval ti is depicted. During a printing interval ti, a line n of the direct thermal printing paper is printed. The printing interval ti is typically at least 300 μs long. In any case, the printing interval ti may not be longer than a line time tz and is in particular the same duration as a line time tz. At the beginning of the printing interval, the direct thermal printing paper 34 has been moved from line n−1 to line n by the pressure roller 40. In the case of stepwise transport of the direct thermal printing paper 34, the direct thermal printing paper 34 is on line n at the beginning of the printing interval. The printing interval consists of a saturation interval ts, during which the heat source 52 is supplied with power by the control device 48. Furthermore, the printing interval ti consists of a cooling interval ta following the saturation interval ts. If the printing interval ti is shorter than the line time tz, the direct thermal printing paper 34 is transported to the next line n+1 following the printing interval ti and by the end of the line time tz. If the printing interval ti is the same length as the line time tz, the direct thermal printing paper 34 is transported into the next line n+1 in the late part of the cooling interval ta and by the end of the line time tz/printing interval ti.

Depending on whether or not the heat source was energized in the previous line n−1 or in the previous lines n−1, n−2, n−3, the saturation interval starts with a waiting time tw, tw', tw". Upon expiration of the waiting time tw, tw', tw", a current is applied to the heat source 52 by the control device 48. The heat source 52 begins to heat up to the printing temperature TD and maintains the printing temperature TD until the end of the saturation interval t. The saturation interval ts is of the same length for all heat sources 52 of the printhead, wherein the waiting time tw, tw', tw" is calculated separately for each heat source 52 of the printhead based on the preceding lines n−1, n−2, n−3 (History Control). In the cooling interval ta, no current is applied by the control device 48 to the heat source 52 and the temperature at the heat source 52 drops to its initial value during this time. Based on the printhead temperature determined by the temperature sensor 58 at the printhead, the control device 48 determines the length of the saturation interval ts.

For two-color direct thermal printing according to the method, a heat source is always heated to the printing temperature. The method does not comprise a first temperature for printing the first color and a second temperature for printing the second colors. In one line, the active heat sources 52 are each heated to the printing temperature TD. The other heat sources 52 are inactive heat sources 52 and are not heated.

Figure 4:
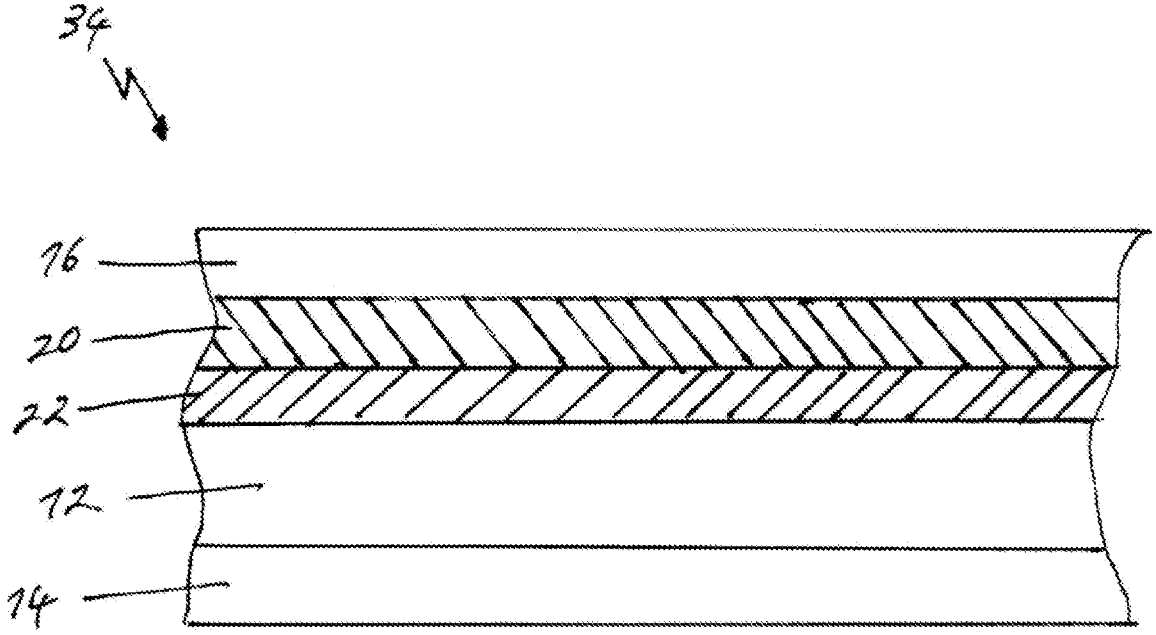
FIG. 4 shows a schematic representation of a direct thermal printing paper for two-color printing in a first embodiment.

FIG. 4 shows a schematic representation of a direct thermal printing paper 34 for two-color printing in a first embodiment. A cross section of the direct thermal printing paper 34 is shown. The direct thermal printing paper comprises a paper layer 12. An adhesive layer 14, i.e., a layer of adhesive, is applied to the underside of paper layer 12. A first thermo-reactive layer 22 is applied above the paper layer 12, which forms a first color, in particular red, when heat is applied. The first thermo-reactive layer 22 discolors red at a temperature of 70° C. to 85° C., in particular 75° C. to 80° C. A second thermo-reactive layer 20 is applied to the first thermo-reactive layer 22 and forms a second color, in particular black, when heat is supplied. The second thermo-reactive layer 20 discolors black at a temperature of 90° C. to 110° C., in particular 95° C. to 105° C. A silicone layer 16 is applied above the second thermo-reactive layer 20 to prevent adhesion of the adhesive layer 14 and to allow release of the adhesive layer 14 when a continuous strip of the direct thermal printing paper 34 is rolled into a roll.

Both the first thermo-reactive layer 22 and the second thermo-reactive layer 20 are transparent if no heat has been supplied to them.

If a first temperature, in particular 75° C. to 80° C., is supplied to the direct thermal printing paper 34, the first thermo-reactive layer 22 discolors red and the second thermo-reactive layer 20 remains transparent. A red print is created. If a second temperature is supplied to the direct thermal printing paper 34, wherein the second temperature is higher than the first temperature, in particular 95° C. to 105° C., the first thermo-reactive layer 22 discolors red and the second thermo-reactive layer 20 discolors black. The second thermo-reactive layer 20 covers the first thermo-reactive layer 22 so that only the black color is visible in the second thermo-reactive layer 22. A black print is created.

Figure 5:
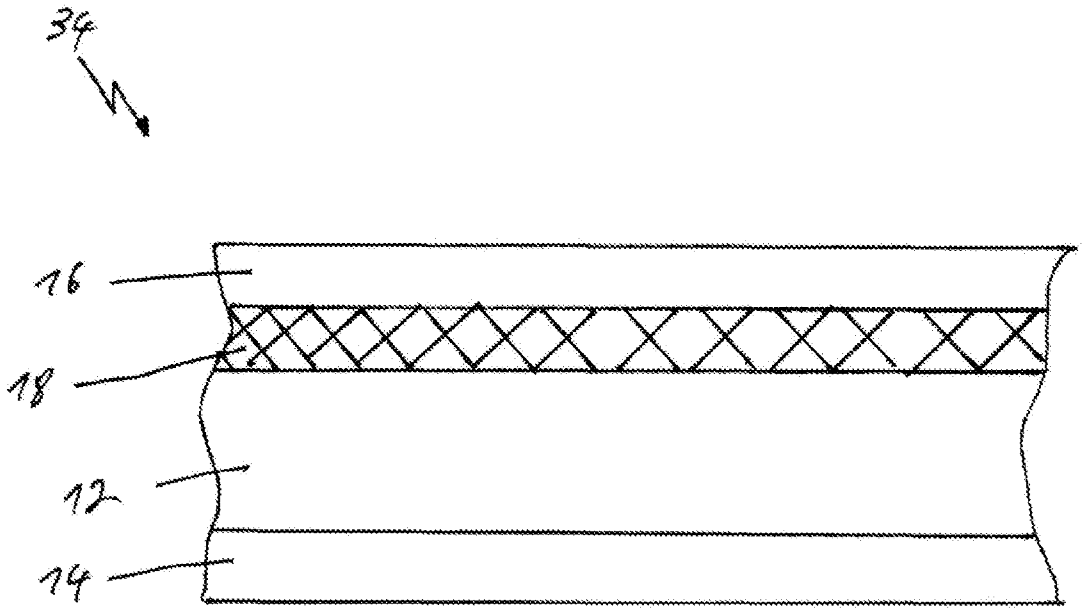
FIG. 5 shows a schematic representation of a direct thermal printing paper for two-color printing in a second embodiment.

FIG. 5 shows a schematic representation of a direct thermal printing paper 34 for two-color printing in a second embodiment. In comparison to FIG. 4, there is no separate first thermo-reactive layer and second thermo-reactive layer. Applied to the paper layer 12 is a thermo-reactive layer 18 which discolors red when a first temperature is supplied and discolors black when a second temperature is supplied.

FIGS. 6 to 15 show various control patterns for controlling the heat sources of the printhead 42 (in landscape format in each case the right hand graphic) and the resulting print image on the direct thermal printing paper 34 (in landscape format in each case the left hand graphic). The control patterns form regular grids. The control data for the direct thermal printer are derived from the control patterns. The printhead is actuated with the control data resulting from a line t0, tz, 2*tz of the control pattern at the times when the corresponding line n, n+1, n+2 of the direct thermal printing paper is located under the printhead. Here, the drawings of the printhead 42 each show 14 adjacent heat sources 52 which are controlled by the control device 48 independently of one another, regularly and as a function of the line time. A 1 means an active heat source, i.e., heat source 52 has a current and temperature profile as shown schematically in FIG. 3. A 0 characterizes an inactive heat source 52, i.e., no heat output takes place at this heat source. The image printed on the direct thermal printing paper 34 is shown schematically. A black area in the drawings indicates a black pixel. A hatched area in the drawings indicates a red pixel. A white area indicates an unprinted, i.e., white, area on the direct thermal printing paper 34.

FIGS. 6 to 12 show 14 successive lines n, n+1, . . . , n+13, which are printed at times t=0, tz, 2*tz, . . . , 13*tz, wherein the times in each case indicate the starting times of the printing interval ti. In each case, regular grids are shown, which have been selected from a larger area. It is therefore a zoom view of an area that appears to be of the same color. As stated above, printing with approximately 12 dots/mm is necessary for a resolution of 300 dpi. This means that the fields shown in FIGS. 6 to 12 have a size of approximately 1.16 mm*1.16 mm (~1.36 $mm^2$).

Figure 6:
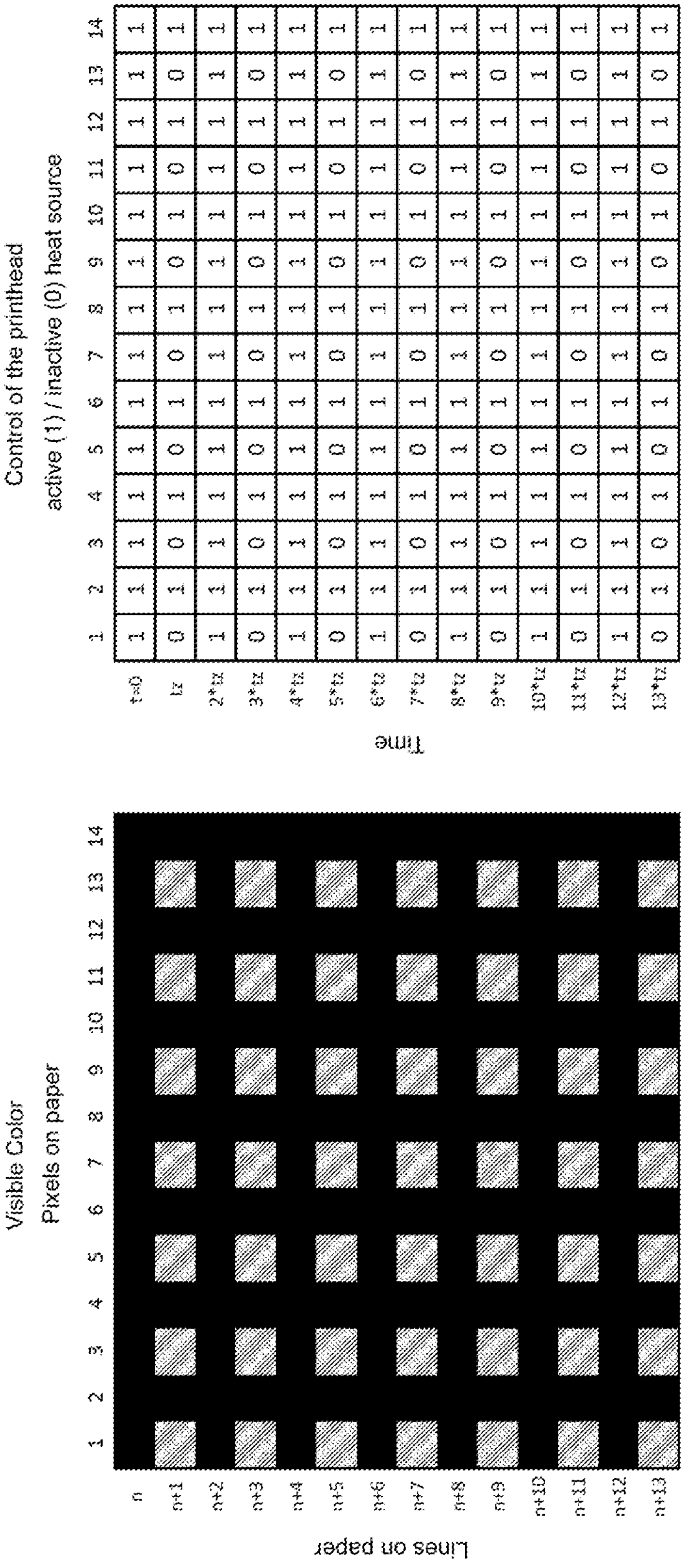
FIGS. 6-15 show various control patterns for two-color direct thermal printing and associated printing results.
Figure 7:
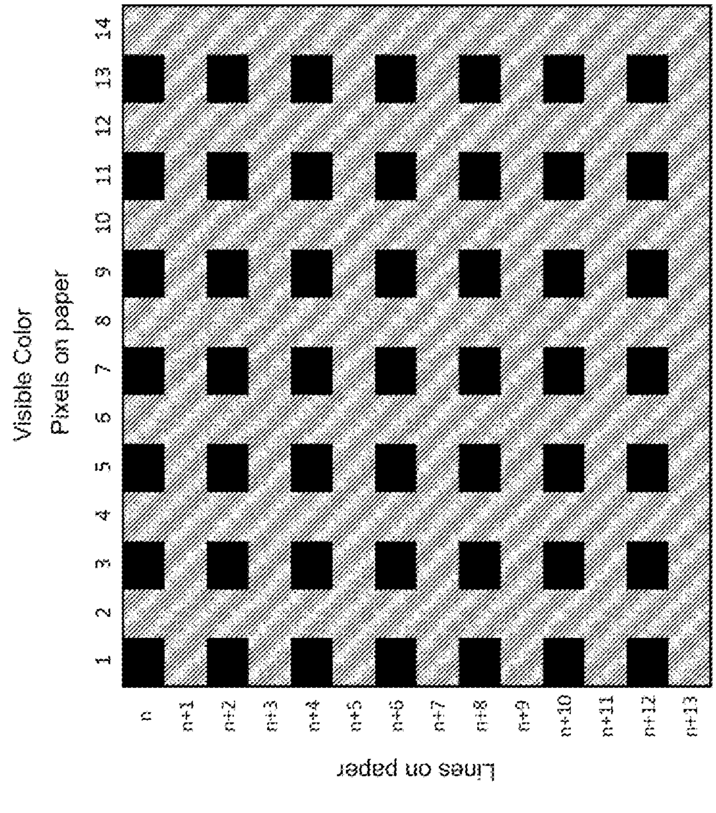
Figure 8:
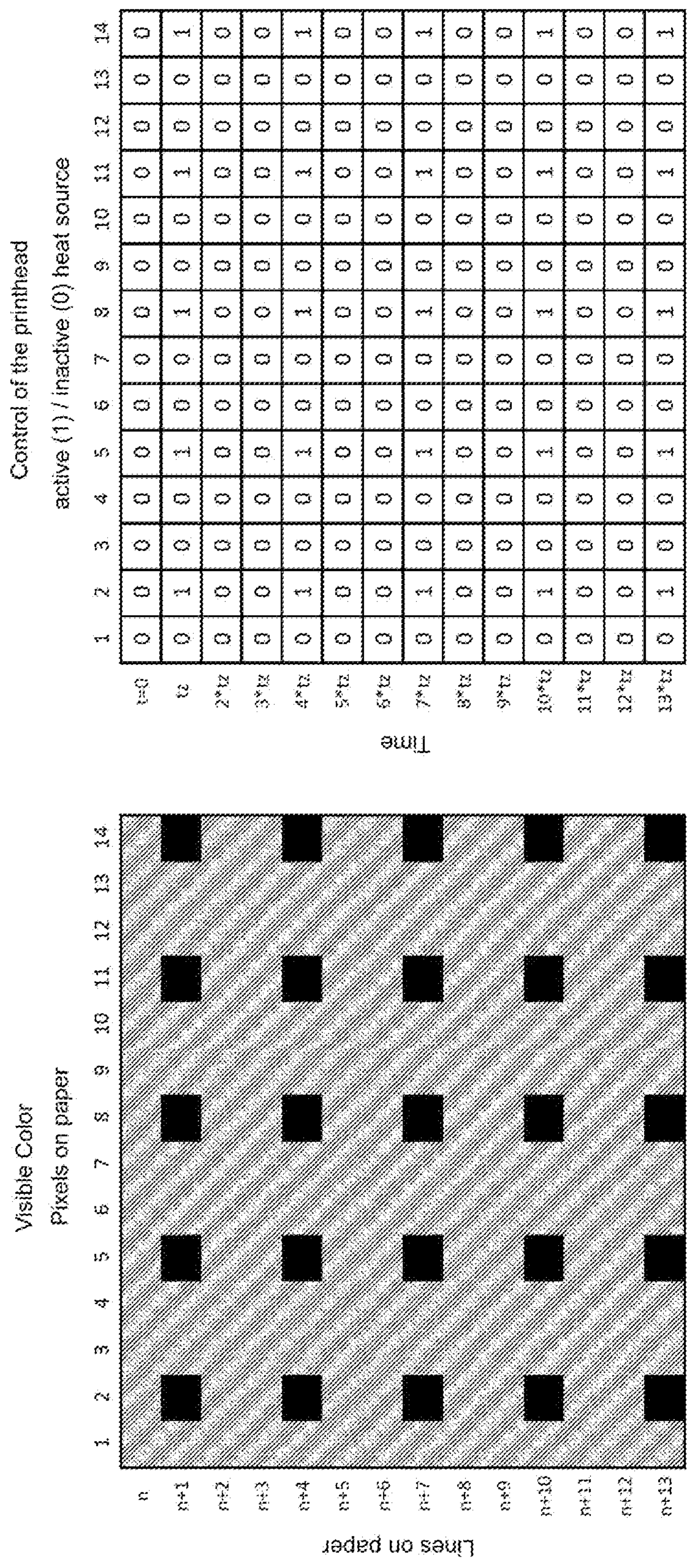
Figure 9:
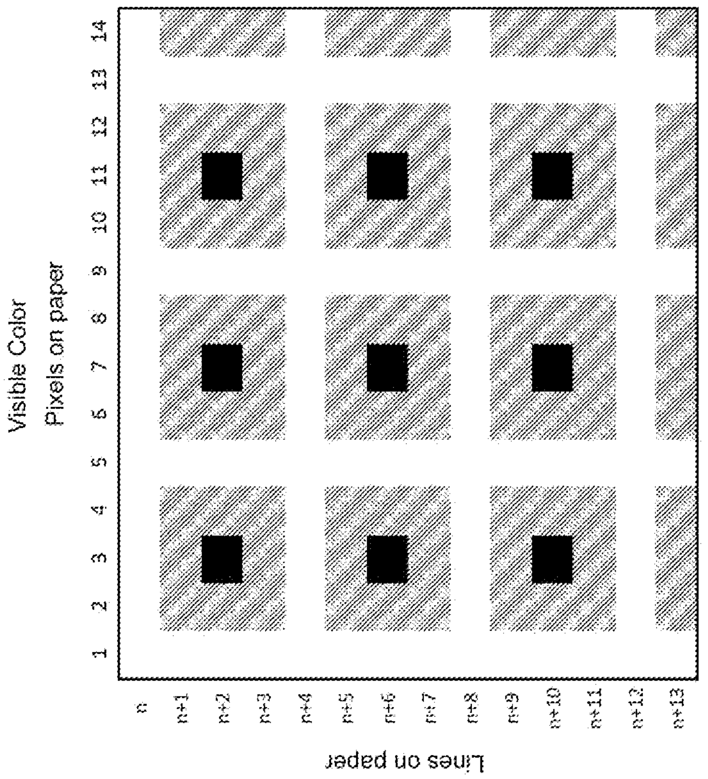
Figure 10:
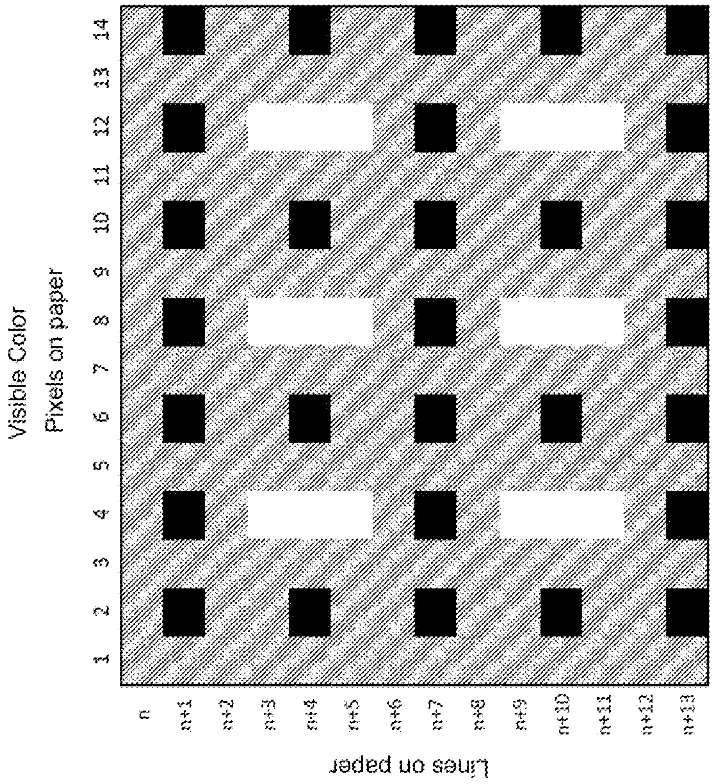
Figure 11:
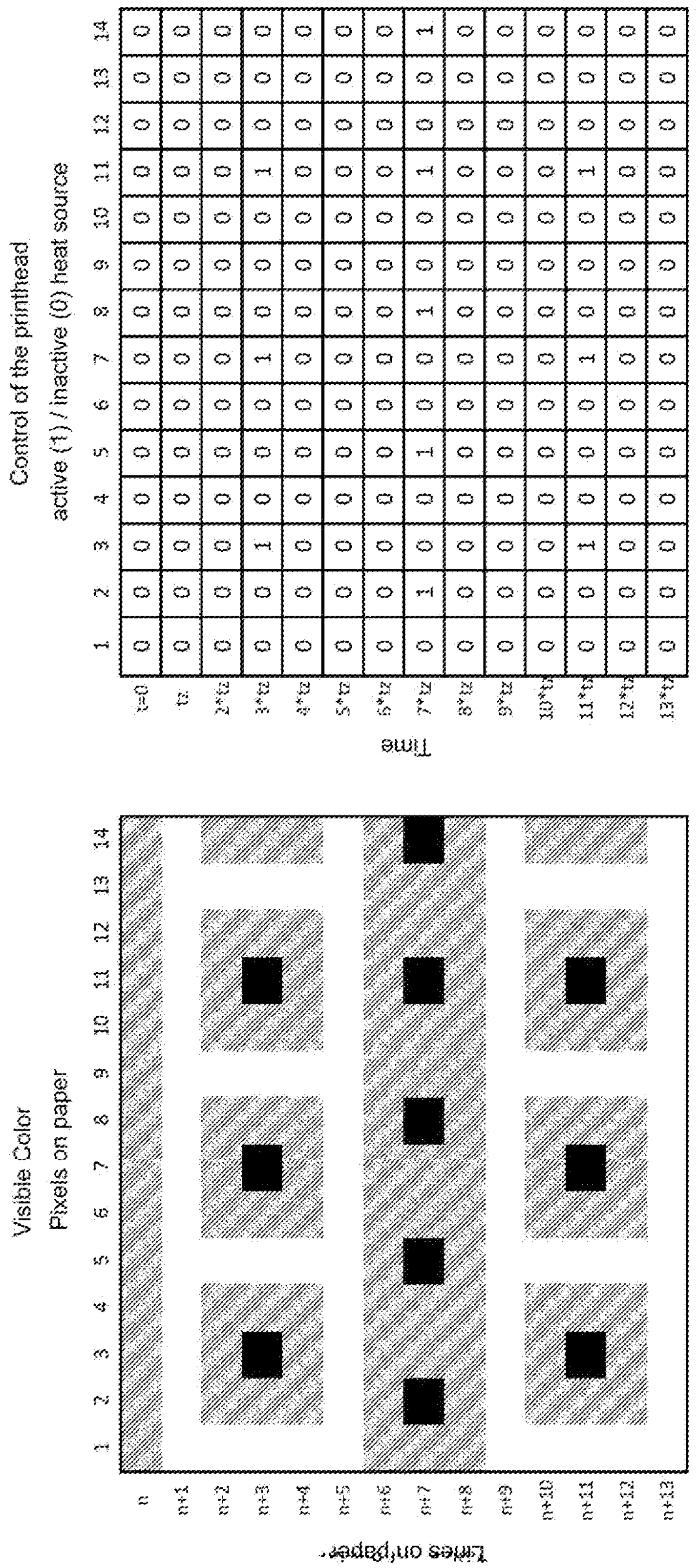
Figure 12:
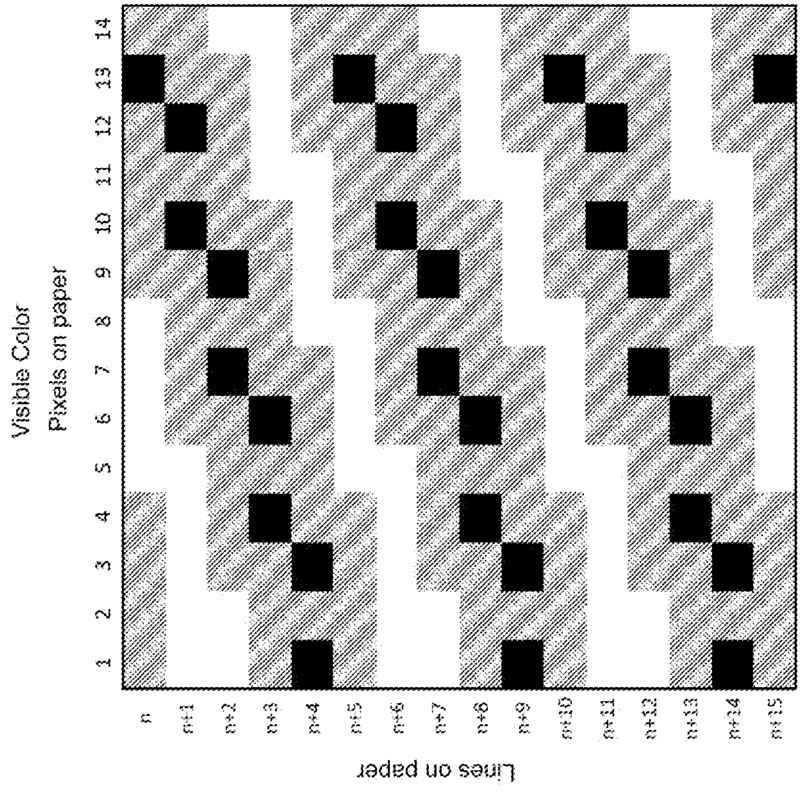

FIG. 6 shows a control pattern with a high proportion of black dots. 75% of the heat sources are active. This means that only 25% of the heat sources are inactive. A black color is formed on the active heat sources and is superimposed with the red color formed on the inactive heat sources. The area shown has a dark shade of red due to the superposition of the black and red colors. The human eye does not recognize the individual pixels but merely an area that forms this shade of red. FIGS. 7 to 12 each show areas that form different shades of red with different proportions of black pixels, red pixels, and white pixels. In doing so, individual heat sources are respectively activated in a line by the control device. A black pixel is formed under these heat sources, red pixels are formed in its vicinity and at a further distance no discoloration of the white direct thermal printing paper takes place. Different color effects can thus be achieved with different grids. For the human eye, red tones of varying brightness are produced.

Figure 13:
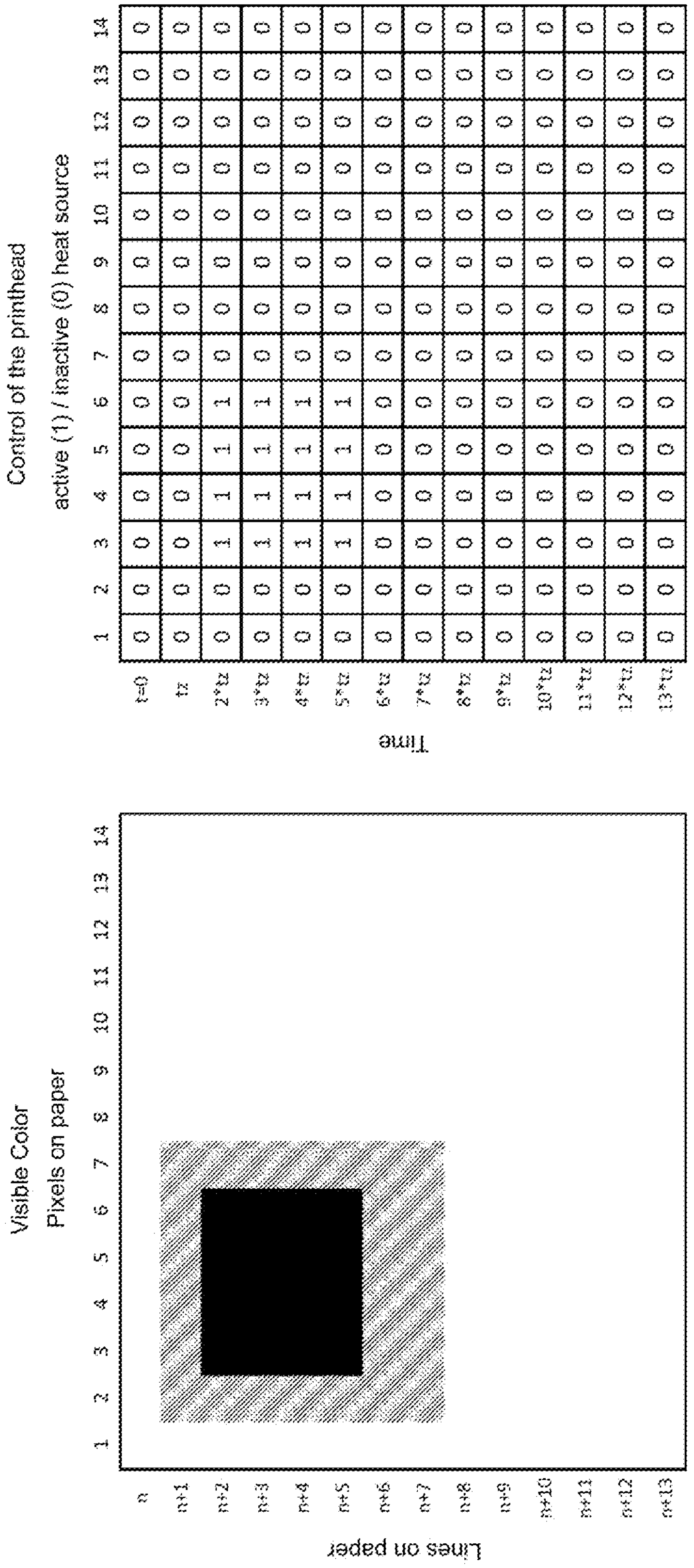
Figure 14:
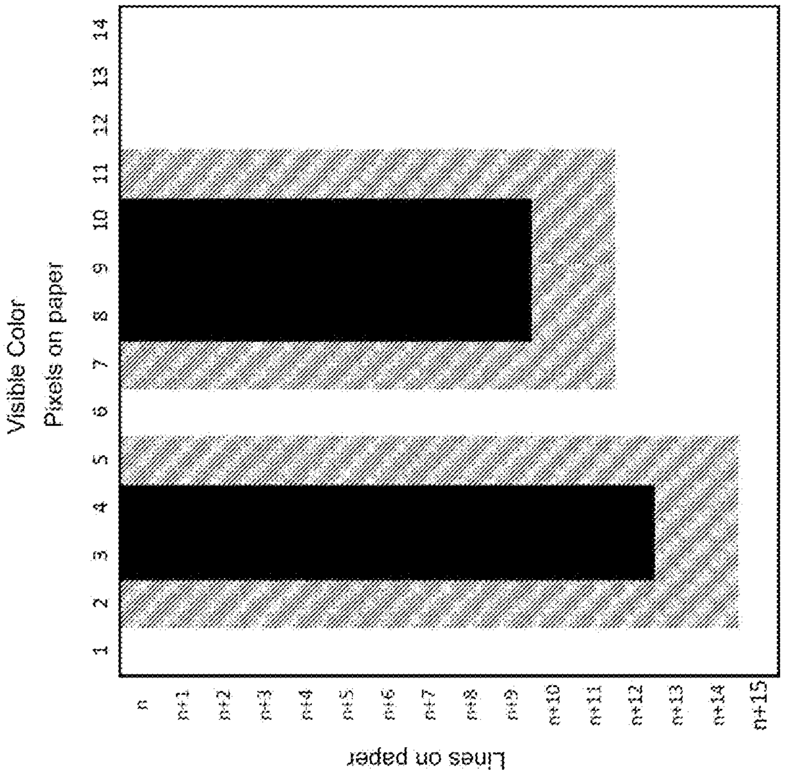
Figure 15:
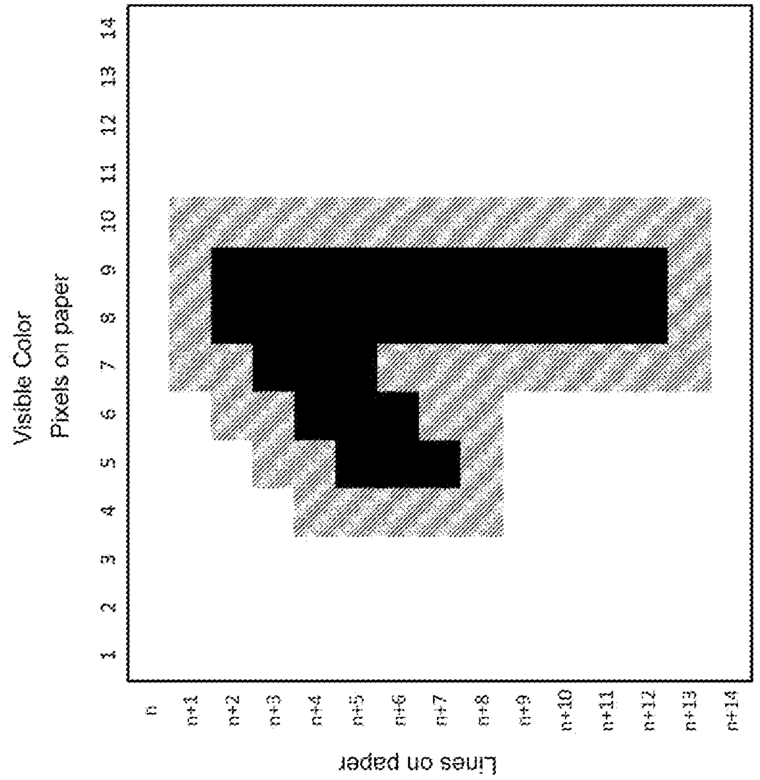

FIGS. 13 to 15 do not show any square print areas but are extended by one or two lines in order to be able to complete the illustration. No regular grids were selected which can be notionally extended beyond the edges of the drawings shown. Rather, completed shapes are shown.

FIG. 13 shows a square black dot of 4×4 pixels (0.3 mm*0.3 mm at 300 dpi). At a high printing speed, the direct thermal printing paper is moved quickly under the printhead by the pressure roller. The cooling interval to shown in FIG. 3 is not large enough for the heat sources to have already cooled down sufficiently at the times (6*tz, 7*tz~lines n+6, n+7). For this reason, the red color runs a little bit behind, and after printing the black pixels in transport direction, not only the pixels of the next line but also the pixels of the line after next are colored red. The same effect occurs in FIG. 14.

FIG. 14 shows a section of a barcode consisting two bars that is printed in black color. The black bars are of different lengths. It is therefore the lower left edge of a barcode. At the edge of the barcode there are slightly longer bars than in the middle, since the number corresponding to the barcode is printed in the middle of the barcode. Due to the reaction of the direct thermal printing paper, it is advantageous to position the bars of a barcode lengthwise in the transport direction. The red bleed effect on the printed paper is thus at the end of the bars and not spread across the barcode. As a result, it is easier to scan the barcode.

FIG. 15 schematically shows the printing of a number in black color. The number comprises very few pixels and would be printed with significantly more black pixels in reality. The red portion is then negligibly low in reality, so that it surrounds the number printed in black with a very thin red border that is barely visible to the human eye.

The drawings are provided solely for the purpose of schematic representation to illustrate exemplary embodiments of the invention. In order to represent individual geometric structures in a real size for a print, significantly more pixels are used. If, in reality, more pixels are used for printing a character, the red portion for a black character is significantly lower than, for example, in FIGS. 14 and 15 and therefore not interfering.

Figure 16:
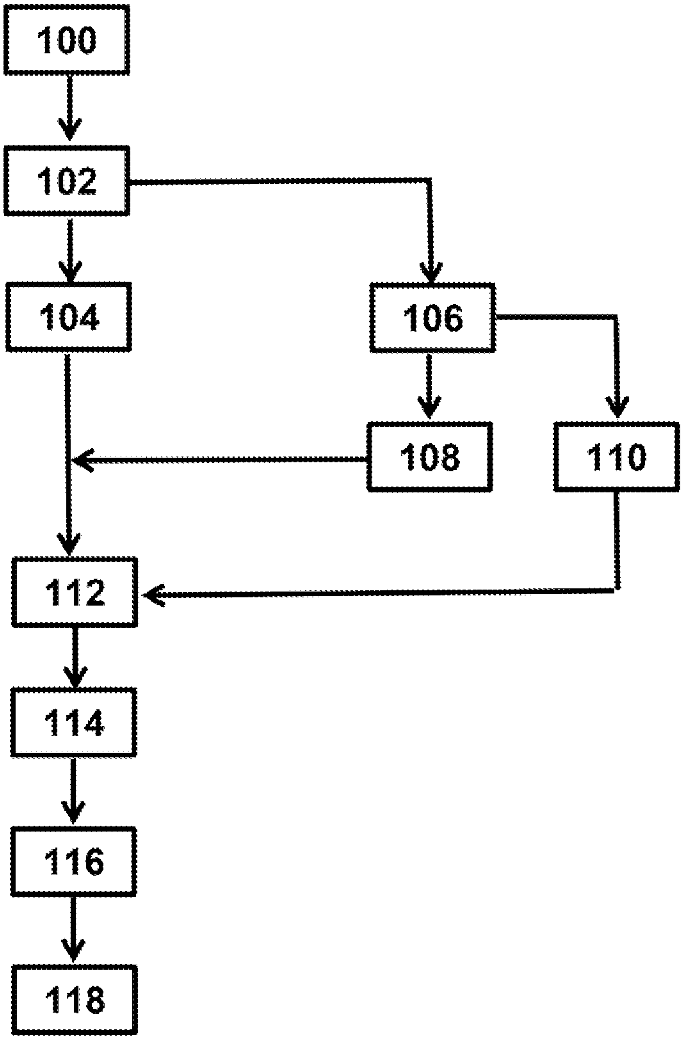
FIG. 16 show a schematic representation of a method for creating control data for operating a direct thermal printer.

FIG. 16 shows a schematic representation of a method for creating control data for a direct thermal printer. In step 100, the control device 74 of the data processing device 70 receives an input from an operator. The operator provides image data of an original image, for example by making a corresponding design via the input/output device 72. In step 102, the control device 74 identifies areas in the image data that are black and areas that are red. In step 104, control patterns in which all print pixels are active print pixels are created for the black areas. In step 106, the brightness of the red areas is determined. In step 108, a grid is defined for the red areas with a first brightness in order to print the red areas with the first brightness at the corresponding brightness. The control pattern for these areas with the corresponding active print pixels is derived from the grid. In step 110, a grid is defined for the red areas with a second brightness in order to print the red areas with the second brightness at the corresponding brightness. The control pattern for these areas with the corresponding active print pixels is derived from the grid. For all other red areas with a different brightness, steps are carried out analogously to steps 108, 110. In step 112, the control patterns of the individual areas are connected to one another and a control pattern for printing is established. In step 114, the input/output device is used to show the resulting print image to the operator for release. If the operator releases the print image, the control data for the direct thermal printer are derived from the control patterns in step 116, i.e., the data for controlling the printhead for each line n, n+1, n+2 are determined. In step 118, the control data are sent from the computing device 70 to the direct thermal printer 30 via the transmitting/receiving device 76.

The functions of various elements shown in the drawings, including the functional blocks, may be realized by dedicated hardware or by generic hardware capable of executing software in conjunction with the corresponding software. If the functions are provided by means of a processor, they may be provided by a single dedicated processor, a single shared processor, or a plurality of generic processors which may in turn be shared. The functions may be provided, without limitation, by a digital signal processor (DSP), network processor, application-specific integrated circuit (ASIC), field programmable gate array (FPGA), read-only memory (ROM) with stored software, random access memory (RAM), and nonvolatile memories.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article “a” or “the” in introducing an element should not be interpreted as being exclusive of a plurality of elements. Likewise, the recitation of “or” should be interpreted as being inclusive, such that the recitation of “A or B” is not exclusive of “A and B,” unless it is clear from the context or the foregoing description that only one of A and B is intended. Further, the recitation of “at least one of A, B and C” should be interpreted as one or more of a group of elements consisting of A, B and C, and should not be interpreted as requiring at least one of each of the listed elements A, B and C, regardless of whether A, B and C are related as categories or otherwise. Moreover, the recitation of “A, B and/or C” or “at least one of A, B or C” should be interpreted as including any singular entity from the listed elements, e.g., A, any subset from the listed elements, e.g., A and B, or the entire list of elements A, B and C.

The invention claimed is:

1. A method for creating control data for operating a direct thermal printer for printing on direct thermal printing paper, the direct thermal printing paper comprising at least one thermo-reactive layer, at least two colors being formable in the at least one thermo-reactive layer, the at least one thermo-reactive layer being configured to form a first color upon a first temperature being supplied, and to form a second color upon a second temperature being supplied, the second temperature being higher than the first temperature, the direct thermal printer comprising a printhead along a paper path from a paper receptacle to a paper outlet, the printhead comprising heat sources that are arranged next to one another transversely to the paper path and are electrically controllable and which are configured to selectively apply heat to the direct thermal printing paper that is movable along the printhead, the method comprising:

receiving, via an input/output device or a receiving device, image data of an original image having at least the first color and the second color; and creating, with a controller, control data for the direct thermal printer for two-color printing of a print image comprising the first color and the second color, the control data comprising a plurality of print lines, and causing, for each print line for each heat source of the heat sources of the printhead, either heating of the respective heat source to a printing temperature or no heating of the respectively heat source.

2. The method for creating control data according to claim 1, wherein at second color locations where the second color is to be formed on the direct thermal printing paper, the control data causes heating of a plurality of adjacent heat sources, of the heat sources, to the printing temperature, and at first color locations where the first color is to be formed on the direct thermal printing paper, the control data causes heating of the plurality of the adjacent heat sources in one portion to the printing temperature and does not cause heating in the other portion of the heat sources.

3. The method for creating control data according to claim 1, the method comprising:

identifying in the image data, with the controller, areas in the first color and areas in the second color;

creating, with the controller, a two-dimensional control pattern, wherein the areas of the image data in the second color in the control pattern are mapped with active print pixels and the areas of the image data in the first color are mapped with a regular grid of active and passive print pixels; and converting, with the controller, the control pattern into the control data by converting the active print pixels and the passive print pixels from the control pattern line by line into control data for the heat sources.

4. The method for creating control data according to claim 3, wherein the regular grid is a grid that repeats itself line by line or column by column, or is arranged obliquely.

5. The method for creating control data according to claim 3, wherein in the control pattern areas of the first color in the image data are mapped into different regular grids based on a corresponding brightness, wherein dark areas in the first color in the control pattern comprise more active print pixels than light areas in the first color.

6. The method for creating control data according to claim 3, wherein in the control pattern, for areas exceeding a predetermined brightness, at least portions of the active print pixels have a minimum spacing such that overlapping of the first color, the second color, and the paper color occurs on the direct thermal printing paper.

7. The method for creating control data according to claim 3, wherein, for brightening an area in the second color in the control pattern for the area consisting of active print pixels in a regular grid, a plurality of groups of adjacent print pixels are inactive print pixels.

8. The method for creating control data according to claim 1, wherein the input/output device comprises a display on which a graphical user interface is displayed and wherein the input/output device is configured to receive inputs for generating a label layout, wherein the inputs comprise characters, standard graphics, colors, sizes, alignments or position, wherein the controller is configured to display on the input/output device the print image resulting on the basis of the created control data, and to compare the print image with the original image.

9. The method for creating control data according to claim 1, wherein the controller comprises an object detection device that recognizes at least one barcode in the image data from an original image received via the input/output device or receiving device and outputs an error message upon a case where the barcode does not have the second color or is not aligned in a print direction.

10. The method for creating control data according to claim 1, wherein the controller for the image data of an original image received by the receiving device performs:
- determining areas having a color and a brightness, wherein the colors of the area correspond to at least the first color, the second color, white, or a superposition thereof; and
- determining a grid of active and inactive print pixels for the individual areas.

11. The method for creating control data according to claim 1, wherein the controller for the image data of an original image received by the receiving device performs:
- rendering the image data in dots of a size of at least 9 or 25 print pixels;
- determining a color and a brightness for each point; and
- determining control data for each dot, wherein active and inactive print pixels for that dot are derived from the color and the brightness of each dot.

12. A non-transitory computer-readible storage medium comprising a computer program comprising program code for performing the method according to claim 1 upon the computer program being executed on a computer or on a computer of the thermal direct printer.

13. A data processing device comprising an input/output device, a controller, and a transmitting/receiving device for transmitting and receiving data via a network, wherein the controller is configured to perform the method for creating control data for operating the direct thermal printer for printing direct thermal printing paper according to claim 1, and the transmitting/receiving device is configured to transmit the control data and/or the control patterns to the direct thermal printer via the network.

14. A direct thermal printer for printing on direct thermal printing paper, the direct thermal printing paper comprising at least one thermo-reactive layer, the at least one thermo-reactive layer being configured to form at least two colors, a first color being configured to be formed upon a first temperature being supplied and a second color being configured to be formed upon a second temperature being supplied, the second temperature being higher than the first temperature, the direct thermal printer comprising:
- a transport roller that is configured to move the direct thermal printing paper along a paper path from a paper receptacle to a paper outlet; and
- a printhead, which comprises heat sources that are arranged next to one another transversely to the paper path and are electrically controllable, the heat sources configured to selectively supply heat to the direct thermal printing paper; and
- a controller, which is configured to control a rotation of the transport roller to move the direct thermal printing paper line by line along the printhead in a printing direction, wherein each of the heat sources of the printhead is electrically connected to the controller and is controllable to heat to a printing temperature, and wherein the controller is configured to:
- receive image data of an original image having at least the first color and the second color; and
- create control data for two-color printing of a print image comprising the first color and the second color, the control data comprising a plurality of print lines, and the control data being configured to cause, for each of the print lines for each heat source of the heat sources of the printhead, either heating of the respective heat source to a printing temperature or no heating of the respectively heat source.

* * * * *